US011260991B2

(12) United States Patent
Ellerton et al.

(10) Patent No.: US 11,260,991 B2
(45) Date of Patent: Mar. 1, 2022

(54) PAPI WITH LED LIGHT SOURCE AND APERTURE PLATES

(71) Applicant: Airfield Lighting Company of NY, Inc., Manlius, NY (US)

(72) Inventors: Andrew B. Ellerton, Manlius, NY (US); Ingo Speier, Saanichton (CA); Jeffrey G. Shaw, Cazenovia, NY (US)

(73) Assignee: Airfield Lighting Company of NY. Inc., Manlius, NY (US)

( * ) Notice: Subject to any disclaimer, the term of this patent is extended or adjusted under 35 U.S.C. 154(b) by 0 days.

(21) Appl. No.: 16/914,702

(22) Filed: Jun. 29, 2020

(65) Prior Publication Data

US 2021/0403178 A1  Dec. 30, 2021

(51) Int. Cl.
*B64F 1/20* (2006.01)
*F21V 5/00* (2018.01)
*F21V 7/05* (2006.01)
*F21V 11/08* (2006.01)
*F21W 111/06* (2006.01)
(Continued)

(52) U.S. Cl.
CPC ............. *B64F 1/205* (2013.01); *F21V 5/00* (2013.01); *F21V 7/05* (2013.01); *F21V 11/08* (2013.01);
(Continued)

(58) Field of Classification Search
CPC .... B64F 1/18; B64F 1/20; B64F 1/205; F21V 11/08; F21V 5/00; F21V 7/05;
(Continued)

(56) References Cited

U.S. PATENT DOCUMENTS 6,295,007 B1 * 9/2001 O'Meara .................. B64F 1/20
340/953
7,375,653 B2  5/2008 Kaminski et al.
(Continued)

*Primary Examiner* — Zheng Song
(74) *Attorney, Agent, or Firm* — Bernhard P. Molldrem, Jr.

(57) ABSTRACT

A precision approach path indicator (PAPI) employs an LED light source with first and second arrays of LEDs or other efficient light sources, disposed one above the other and emitting their respective color lights along an optic axis to a collimating lens of focal length f. First and (optional) second aperture plates positioned along the optic axis, each being a respective frame with a cut-out defining a horizontally elongated aperture for light passing along the optic axis. Intermediate aperture plate(s) can be positioned between the first and second aperture plates. The first frame is positioned between the light source and the collimating lens at the focal distance f from the lens. The optional second aperture plate is positioned at the collimating lens and covers top, bottom, and side edge portions of the lens. A planar blade extends from the light source to the first frame and has a distal edge extending across the aperture of the first aperture plate, substantially at the focus of the collimating lens, dividing the beam into white and red sectors. The intermediate aperture plate(s) can be adjusted for optimal separation. The PAPI can be considered to have an illumination portion formed of the light source(s), blade, and first frame; and an imaging portion formed of an enclosure and a lens positioned at its focal length distant from the front frame aperture and edge of the blade.

20 Claims, 13 Drawing Sheets

(51) Int. Cl.
*F21Y 115/10* (2016.01)
*F21Y 113/13* (2016.01)

(52) U.S. Cl.
CPC ....... *F21W 2111/06* (2013.01); *F21Y 2113/13* (2016.08); *F21Y 2115/10* (2016.08)

(58) Field of Classification Search
CPC ............ F21W 2111/06; F21W 2113/13; F21Y 2115/10; B64D 2203/00
See application file for complete search history.

(56) References Cited

U.S. PATENT DOCUMENTS

| | | | |
|---|---|---|---|
| 7,755,513 B2 * | 7/2010 | Wang | B64F 1/20 |
| | | | 340/955 |
| 7,755,514 B2 | 7/2010 | Kaminski et al. | |
| 8,550,658 B2 | 10/2013 | Hansler et al. | |
| 9,228,721 B2 * | 1/2016 | Hesch, Jr | H05B 47/10 |
| 2007/0115141 A1 * | 5/2007 | Kaminski | B64F 1/20 |
| | | | 340/947 |
| 2008/0137345 A1 * | 6/2008 | Wimberly | F21V 7/09 |
| | | | 362/299 |
| 2010/0123398 A1 * | 5/2010 | Tian | H05B 45/30 |
| | | | 315/119 |
| 2012/0223255 A1 * | 9/2012 | Walker | B64F 1/20 |
| | | | 250/495.1 |
| 2013/0155671 A1 * | 6/2013 | Kurt | F21V 5/008 |
| | | | 362/231 |
| 2014/0168609 A1 * | 6/2014 | Bertin | B64F 1/20 |
| | | | 353/14 |
| 2015/0003054 A1 * | 1/2015 | Shemwell | B64F 1/20 |
| | | | 362/231 |

\* cited by examiner

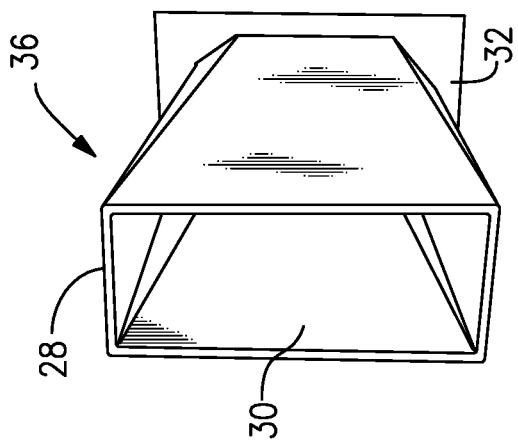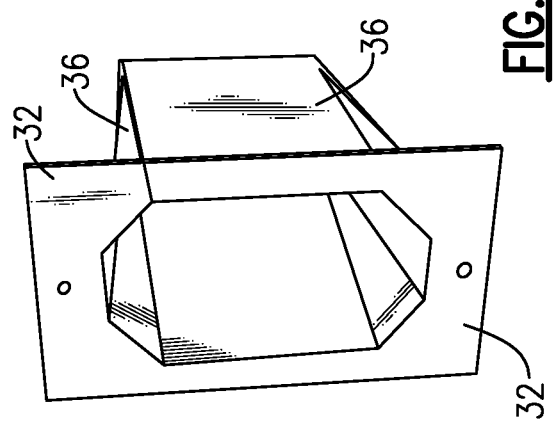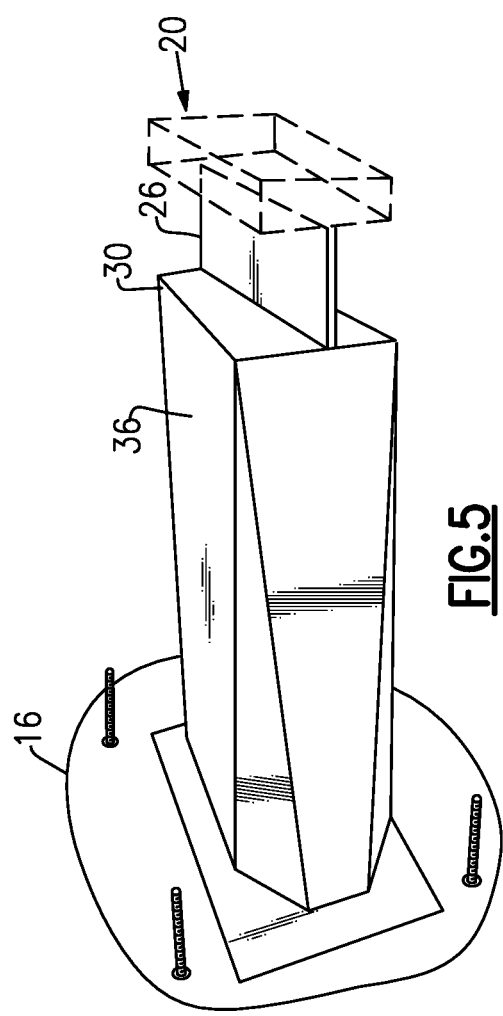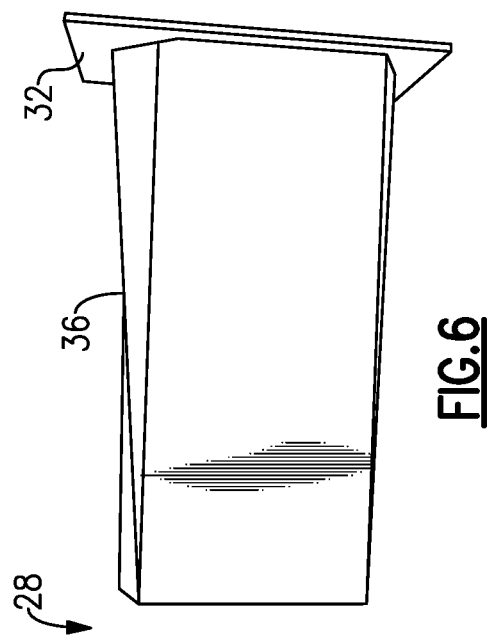

PAPI WITH LED LIGHT SOURCE AND APERTURE PLATES

BACKGROUND OF THE INVENTION

This invention is directed to aviation safety and control equipment, and is more specifically concerned with ground-based runway approach equipment for visual assistance to the airplane pilot in safely landing the airplane. The invention is more particularly concerned with an improved precision approach path indicator system, i.e., PAPI system. Such system is positioned at an approach end of an airport runway and provides visual aid to a pilot landing the aircraft by indicating the plane's position relative to a predetermined glide path.

Precision approach path indicators, or PAPI, are discussed in Advisory Circular AC NO. 150/5345-28H (Jul. 29, 2019) promulgated by the US Federal Aviation Administration.

The PAPI system typically consists of four light units arranged in a line transverse to the runway center line at the target landing point on the runway, with the light units usually being disposed to the left of the runway.

Each light must provide a beam of light split horizontally with aviation-white light in the top sector (above the horizontal split line or transition line) and red light in the bottom sector. To ensure a sharp division between red and white sectors when the PAPI light unit is viewed from 1,000 feet (300 meters) the transition from red light to white light must be within 3 minutes of arc at the beam center, and within 5 minutes of arc at the beam edges. The transition band must be essentially flat within 3 minutes of arc.

Originally, PAPI units used incandescent halogen lamps as their light sources. However, due to considerations of power usage, lamp-life ratings, and heat issues, alternative light sources, e.g. LED's, are more attractive for newer PAPI units. Proper chromaticity can be achieved using LED's as alternative light sources. Testing has shown that both for pilots with normal color vision and for color-vision waived pilots (having some color vision deficiency) the pilots will perceive the same color transition on red and white LED PAPI systems as with traditional incandescent PAPI systems. However, in order to achieve sufficient luminous intensity from an LED light source, it is necessary to employ an array of a multiplicity of LEDs, and not a point light source, or a COB which is an array of LEDs configured as a single light source. Accordingly, it has been difficult to achieve the required red-white transition within the maximum allowed 3 minutes of arc.

Prior LED-based PAPI units are discussed, e.g., in Hansler U.S. Pat. No. 8,550,658, Tian U.S. Pat. No. 8,434,905, and Kaminski U.S. Pat. No. 7,375,653. Kaminski requires a pair of reflective surfaces that angle together and form a sharp edge, with the two surfaces reflecting light from a bank of red LEDs and a bank of white LEDs, respectively. The reflected light proceeds to a collimator lens or projection lens. The Kaminski unit also uses a lateral spreader lens. The Hansler PAPI unit has a single array of LEDs, a horizontal blade positioned between red and white LEDs, and first and second focusing lenses along the same optic axis. The Hansler unit also incorporates a light detection and feedback circuit to control the LED lamp intensity. Other equivalent light sources such as solid-state lasers, and VCSELs (vertical surface emitting lasers), are now or will be available in future, but for convenience's sake the term LED will be used in this specification and in the claims to cover all such devices.

OBJECTS AND SUMMARY OF THE INVENTION

It is an important object to provide an LED-illuminated precision approach path indicator or PAPI arrangement that is simplified in construction and provides a sharp, flat transition between the red and white beam portions to provide pilots an accurate indication of their actual approach relative to the approach path for safe descent to the airport.

It is another object to provide an LED-illuminated PAPI arrangement that is constructed with a single collimator lens per beam.

A further object is to optimize the sharpness of transition between red and white sectors.

In accordance with an embodiment of this invention, a precision approach path indicator (PAPI) device is configured to project a beam of light along an airport runway glide path that transitions from a first color to a second color when a plane moves above or below the runway glide path. The current convention is that the two colors are red and white, but the color scheme can change depending on application. In this invention, the PAPI device has a case or housing, with a light source within the housing. Here the light source has first and second arrays of LEDs, i.e., an array of red LEDs and an array of white LEDs. The two arrays are disposed one above the other and generally in a vertical plane defining a generally horizontal axis normal to the arrays, such that the arrays emit light along that axis. A collimating lens of a predetermined width and height has a predetermined focal length f, and has an optic axis aligned with the axis of the light source. The collimating lens is spaced distally from the light source. Also along the optic axis of the lens there are first baffle or aperture plate and (preferred, but optional in some cases) second baffle or aperture plate, each being a respective frame with a cut-out defining an aperture for shaping the light passing along the optic axis. The first frame is positioned between the light source and the collimating lens at a distance from the lens substantially equal to the lens's focal length f. The first frame has a horizontally elongated cut-out or aperture. The second frame (when used) is positioned at the collimating lens and covers top, bottom, and side edge portions of the lens. This second frame has a horizontally elongated aperture. A planar blade extends from the light source to the first frame and has a proximal edge positioned between the first and second arrays of LEDs. This blade also has a distal edge extending across the aperture of the first frame so that the first frame is substantially at the focal distance f from the collimating lens. The blade divides the beam into white and red sectors at the plane of the first frame. The planar blade may have reflective upper and lower surfaces. One or more intermediate frame(s) can be positioned at suitable positions between the first and second frames along the beam axis (or between the first frame and the collimating lens).

The second frame in the below-described embodiment(s), here adjacent the collimating lens, helps to block light from the light source from reaching upper and lower sectors of the collimating lens at its edges and from reaching left and right sectors at the edges of the collimating lens. This arrangement permits the light to reach the lens at an elongated central portion defined between the upper, lower, right and left sectors at the edge of the lens.

In one described embodiment, a tubular or box-like shell surrounds the light beam and encloses the optic axis between the light source and the lens, with its ends joined with the first and second frames. The shell can have generally flat sides on top, bottom, left and right defining a generally rectangular section; the shell is opaque and generally non-reflective. In a preferred arrangement, the aperture of the first frame has a width substantially one-and-one-half to two-and-a-half times its height. The aperture of the second frame can have a horizontally elongated octagonal shape, and favorably has an aperture where the height may be about a given fraction of its width. That is, the apertures may be horizontally elongated to be about 1.5 to 2.5 times as wide as they are tall. While the apertures may be rectangular, they may also be octangular, ellipsoial, or a similar shape. The baffles or frames and their apertures are calibrated to match the particular lens or lens group that is used in the PAPI device for optimal beam separation.

The two arrays of LEDs of the light source respectively emit light of the first and second colors, and are each formed as a plurality of horizontal rows of LEDs that emit light of the respective color (although, the white light may be generated either by white LEDs or by a mixture of LEDs of the primary and complementary colors as needed to constitute white light). The arrangement is not limited only to horizontal rows of LEDs, as these may be placed in other arrangements, e.g., designed for optimal illumination. The planar blade is disposed on a substantially horizontal plane situated between the lowest row of the first array and the uppermost row of the second array. This results in one color, e.g., red being entirely above the blade and the other e.g., white being entirely below the blade. The collimating lens directs the light along the optic axis on a beam in which the white light is above a horizontal transition and the red light is below the horizontal transition.

There are typically four of these PAPI devices arranged in a line that is transverse to the runway center line and off from one edge, e.g., left, of the runway edge. These are directed at successive angles so that for an aircraft approaching directly on the runway glide path, the two beams nearer the runway will appear red and the outer two will appear white, and the number or red and white beams will change depending on the height of the approaching airplane relative to the proper glide path.

These and other important features of the invention will become apparent from the ensuing description of a preferred embodiment, when considered in connection with the accompanying Drawing.

BRIEF DESCRIPTION OF THE DRAWING

FIG. 5 is a perspective view illustrating a light shell of an embodiment, with first and second (i.e. proximal and distal) aperture plates or frames, with the second, distal frame being positioned at or near a plane defined by a lens mount.

FIG. 6, FIG. 7 and FIG. 8 are a top plan view thereof, a proximal perspective thereof, and a distal perspective thereof, respectively.

DETAILED DESCRIPTION OF A PREFERRED EMBODIMENT

Figure 1:
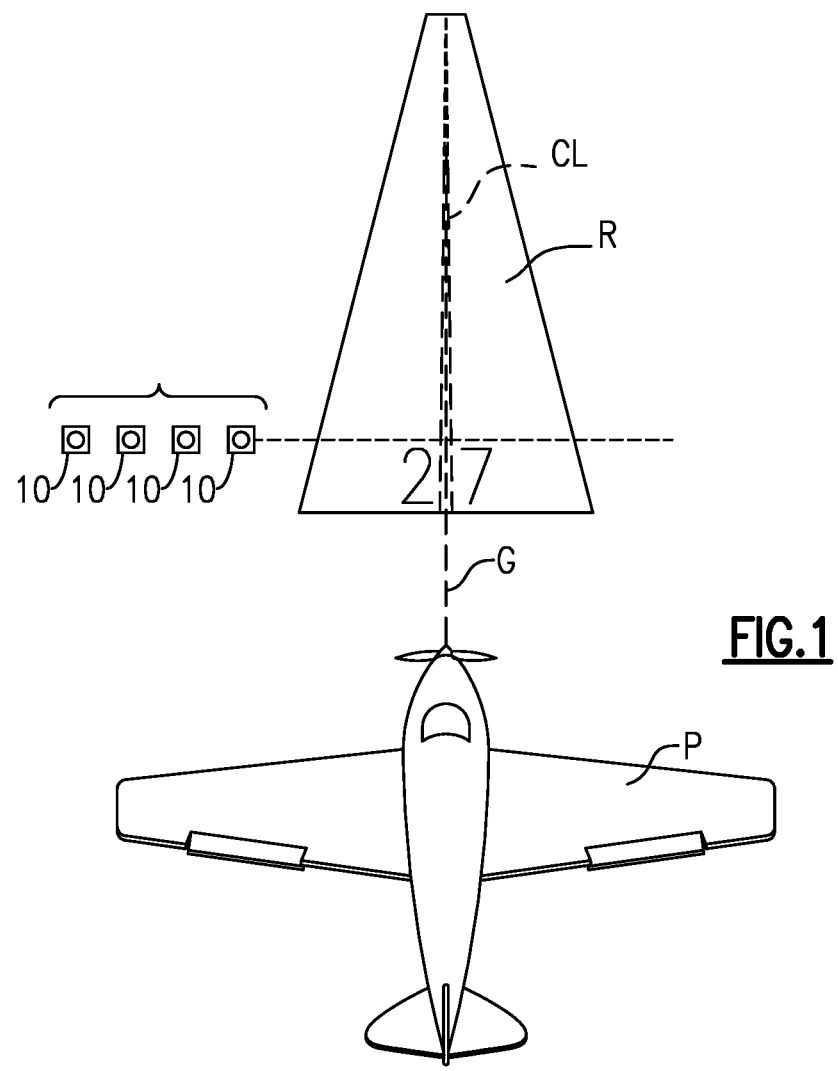
FIG. 1 is a perspective view explaining the role of the PAPI devices that embody this invention in safe approach and landing of an airplane.

With reference to the Drawing Figures, and initially to FIG. 1 thereof, an airport precision approach path indicator (PAPI) system here includes a row of four light assemblies 10 perpendicular to the centerline CL of a runway R and placed to one side of the runway, here the left side on approach. The line formed by the transverse row of light assemblies crosses the runway R approximately at a target spot on the runway where a landing airplane would touch down. These PAPI light assembly units may have an incandescent light source, but in the embodiments of this invention discussed here, each has as its light source one or more arrays of light-emitting diodes or LEDs, favorably an array of white LEDs and an array of red LEDs. In some embodiments, an array of primary color LEDs may be employed to generate white light.

These assemblies 10 are each angled above the horizon at respective different angles. Each of the light assemblies is optically configured to project a beam of light toward an approaching airplane P. The light beam is white above a horizontal transition line, and red below the horizontal transition line. If the airplane P is on the correct path, the pilot will see the two right assemblies 10 as red and the two left assemblies 10 as white. If the assemblies 10 show as one red and three white, the airplane P is slightly above the glide slope, if all four are white, the airplane P is well above the proper glide slope. On the other hand, if the lights show as one white and three red, the airplane P is slightly below the glide slope, and if all four are red the airplane is well below the glide slope, and the pilot should pull up and get the aircraft back on the proper glide slope or else climb and go around for a second landing approach. There are minimum standards of brightness for the PAPI light assemblies, and for the sharpness of transition between red and white as the approaching airplane P moves along its approach.

Prior attempts to create an LED-based PAPI light assembly have required complex optical systems usually with nearly entirely separate beam paths for the white light and red light, and plural collimating lens groups with plural lenses. In the present invention, as explained in terms of one preferred embodiment, the PAPI light assemblies can each be formed with a straightforward optical system including as a light source a bank of LEDs with rows of one color LED above a horizontal center line and rows of the other color LED below the center line, both arrays being in more or less the same vertical plane, a forward or distal frame located at the collimator lens, a rear or proximal frame located on the optic axis at a distance substantially at the focal length f of the lens, and a horizontal blade or plate extending from the proximal frame back to the centerline of the LED light source (so that the red light is above and the white light is below the horizontal blade). Each of the proximal and distal frames has an aperture for the light, the aperture being horizontally elongated, e.g., rectangular for the proximal aperture and a horizontally elongated octagon for the distal aperture. This arrangement confines the light to the dimensions of the two apertures, avoiding stray light from reaching the lens, and also avoiding use of the very top and bottom of the collimating lens. The two frames can be combined with a shell that serves as a light tunnel, so that the frames are at ends of the light tunnel. The shell may also function as mechanical support. This facilitates alignment of the components, and also precludes light from outside the shell from reaching the collimating lens. The shell can favorably be absorptive, at least on its interior surfaces. This configuration helps achieve the required sharpness of transition between red and white sectors of the beam.

Figure 2:
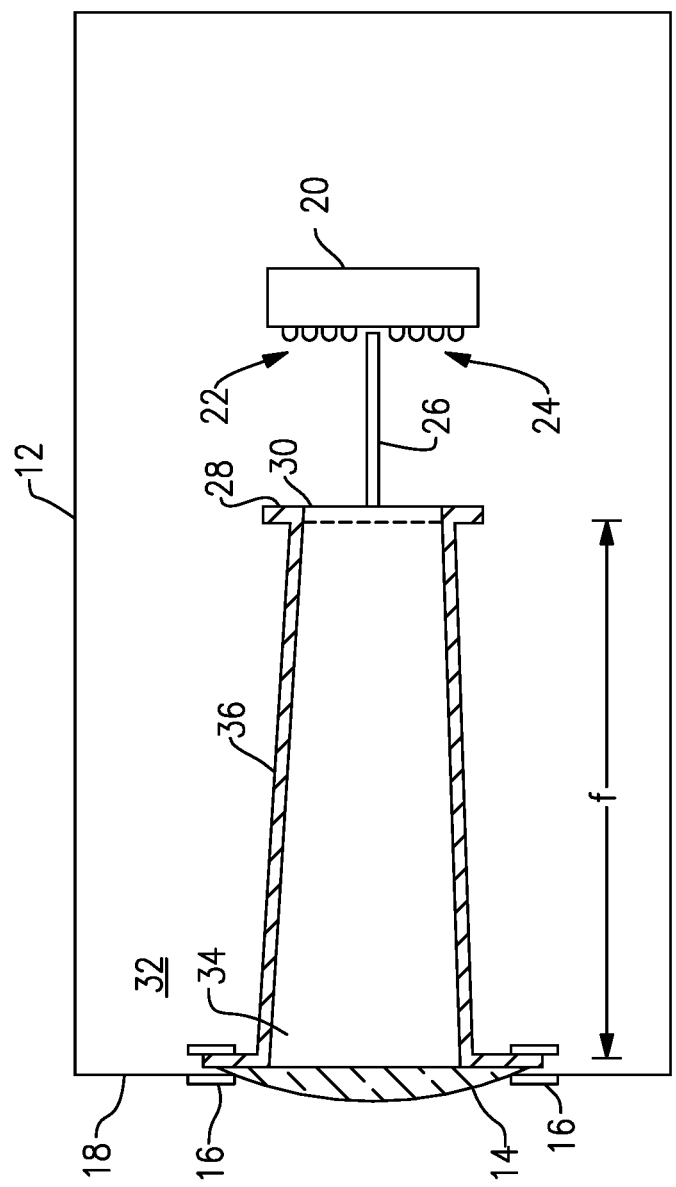
FIG. 2 is a schematic cut-away side elevation of a PAPI device according to one embodiment of this invention.
Figure 3:
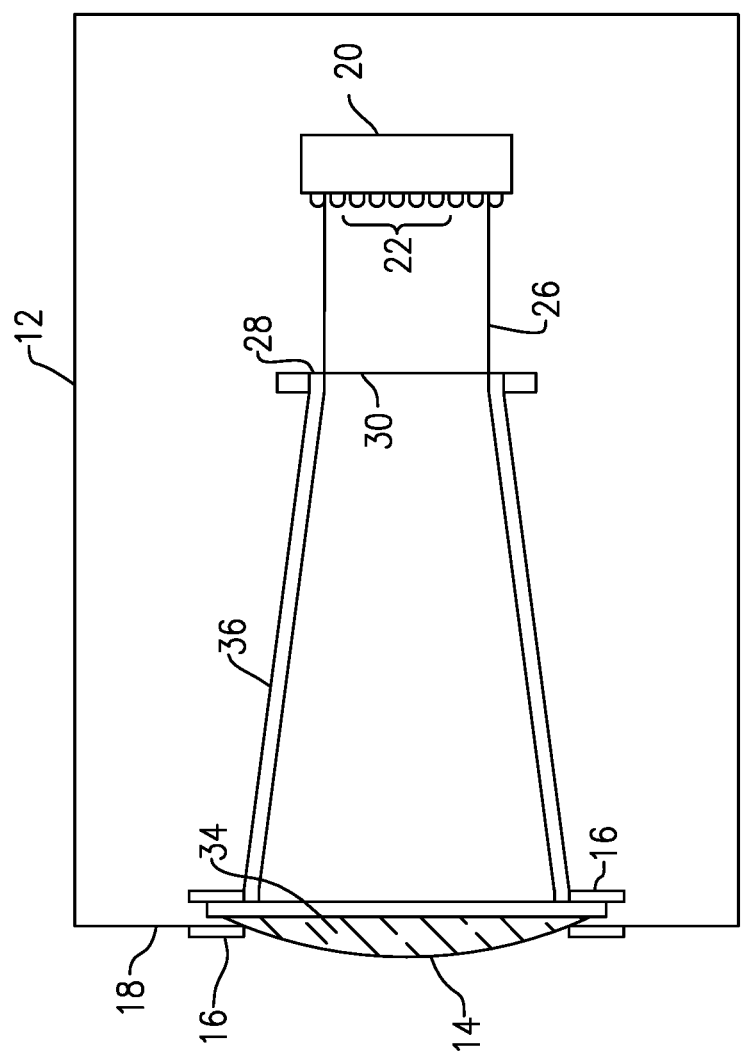
FIG. 3 is a schematic top plan view thereof.

A PAPI light assembly unit 10 according to one embodiment of this invention is illustrated schematically in a schematic side elevation in vertical section in FIG. 2 and in a top plan in horizontal section in FIG. 3.

Here the light assembly unit 10 has a housing 12 in the form of a box, with a collimating lens 14 held by a lens holder frame 16 in a circular aperture on a front panel 18 of the housing. Within the housing there is a light source, here including an array or arrays of LEDs, in this case a first array 22 of red LEDs disposed in horizontal rows above a second array 24 of white LEDs also disposed in horizontal rows, and with a horizontal midline being defined between a lowermost row of the array 22 and the uppermost row of the array 24. A generally planar blade or plate 26 (or membrane in some cases) of a generally rigid opaque material has a proximal or back edge disposed at the midline of the light source, and a forward or distal edge situated at a location that is separated from the lens 14 by a distance substantially equal to the focal distance f of the lens 14. The blade or plate 26 defines a mid-plane that separates the white portion of the beam from the red portion, i.e., the plate defines the transition between red and white. This blade or plate can be a thin, flat opaque element, but need not always be of uniform thickness. In some embodiments, the upper and lower surfaces of the blade 26 can be reflective. A generally rectangular proximal frame 28 is situated transverse to the optical axis of the lens 14, and defines a generally oblong opening 30 that has a height about half its width. The frame 28 is situated at the focal distance f from the lens 14 and thus at the distal edge of the blade or plate 26. The forward or distal edge of the blade 26 is situated at the midline of the horizontally elongated opening 30, halfway between its upper and lower edges, and extends for the entire width thereof.

A front frame 32 is positioned on the inside or proximal face of the lens 14 and this also defines a horizontally elongated rectangular aperture 32 that extends across the vertical center part of the lens 14 and horizontally most of the way across the lens 14. Preferably, the LEDs in the light source 20 are individually lensed, e.g., with LEDIL lenses, so they are pre-collimated. The same lens can be used on each of the LEDs, although different lenses could be used for the different LEDs to achieve optimal illumination. The light source 20, plate 26, proximal frame 28, distal frame 32 and lens 14 are all disposed along the same optic axis. Here, a tubular shell 36 is formed unitarily with the proximal frame 28 and distal frame 32. The frame 28 may incorporate mounting clips or the like for supporting the plate 26 at its distal edge. In some embodiments, the plate 26 may have reflective upper and lower surfaces. The shell 36 can have upper and lower sides that are parallel or sides that diverge slightly, as shown in FIG. 2.

Figure 4:
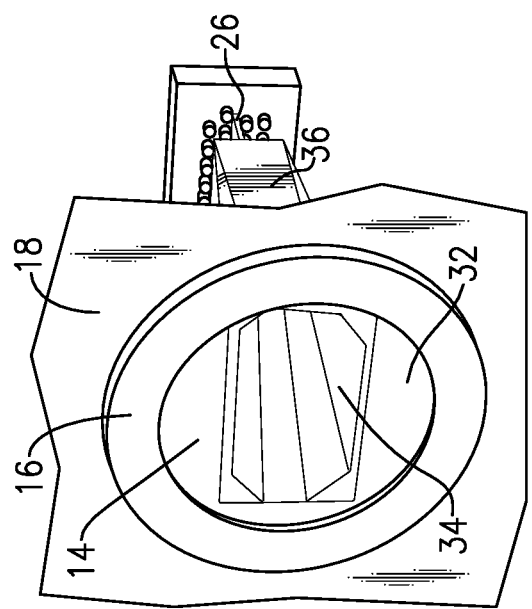
FIG. 4 is a front or distal perspective of lens, frame shell, LED array(s) and mounts of this embodiment.

The shell 36 mechanically connects the proximal and distal frames 28, 32 holding them rigidly in place, and also serves as a light shield precluding light that might reflect from interior surfaces of the housing from reaching the proximal side of the lens 14. The length of the shell 36 along the optic axis should be substantially the focal length f of the lens 14 so that the distal edge of the blade 26 is imaged out to the distance along the glide path. The elongated generally octagonal aperture 34 can be seen through the collimating lens 14 in FIG. 4. As shown in FIG. 5, the shell 36 may have its side walls angling outward towards the distal end, creating chamfered corners. The position of the light source 20 is shown in broken line, relative to the plate 26 and proximal aperture 30, is shown in FIG. 5.

The actual shape of one embodiment of the shell 36 is shown in FIGS. 6, 7, and 8, which are top plan, proximal perspective and distal perspective, respectively. The exact shape and materials used can vary, but the materials should be sturdy enough for the PAPI to be employed out of doors for extended periods of time in both moderate and severe weather.

The lens 14 may be comprised as a single element lens, or may be a lens group that comprises a number of lens elements as desired for improved optical properties. In some embodiments there may be space between some of the successive lens elements, or the unit may include a second lens along the axis.

Figure 9:
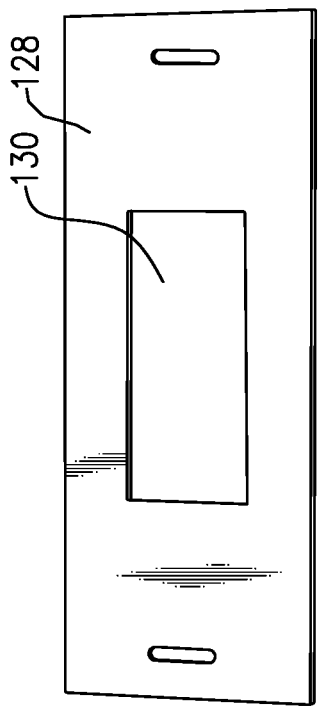
FIG. 9 and FIG. 10 are views of generally planar first and second frames according to an alternative embodiment of this invention.
Figure 10:
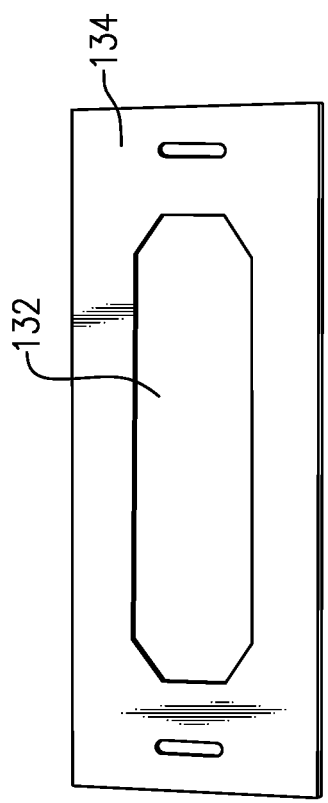

FIGS. 9 and 10 show separate proximal and distal frame elements 128 and 132 which can be employed in a PAPI light assembly without being unified with a shell. In this case the proximal or rear frame 128 could be mounted in the housing and spaced from the light source 20 at the forward edge of the blade or plate 26 to define the oblong proximal aperture 130, and the distal or front frame 132 would be mounted on the inward or proximal side of the lens 14 defining a front aperture 134, here of an oblong or horizontally elongated octagonal shape. The width to height ratio of these apertures is in some cases about 3:2 to 3:1, as needed to obtain optimal performance from the light source 20 and lens 14. These frames 128 and 132 are shown as generally planar but may include other structure, and the rear or proximal frame may be formed unitarily with the horizontal or transverse blade or plate 26. The frame 132 can have an aperture that is about 60 millimeters high by 100 millimeters wide, for example.

Figure 11:
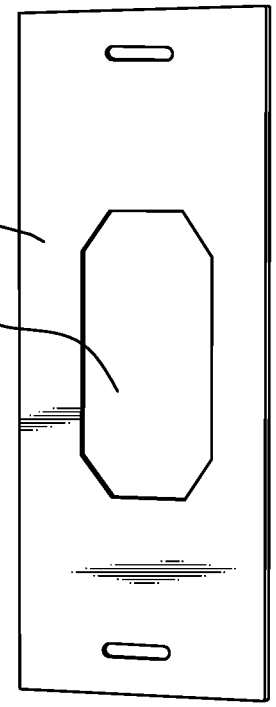
FIG. 11 shows an intermediate frame with aperture which may be employed in some embodiments.
Figure 12:
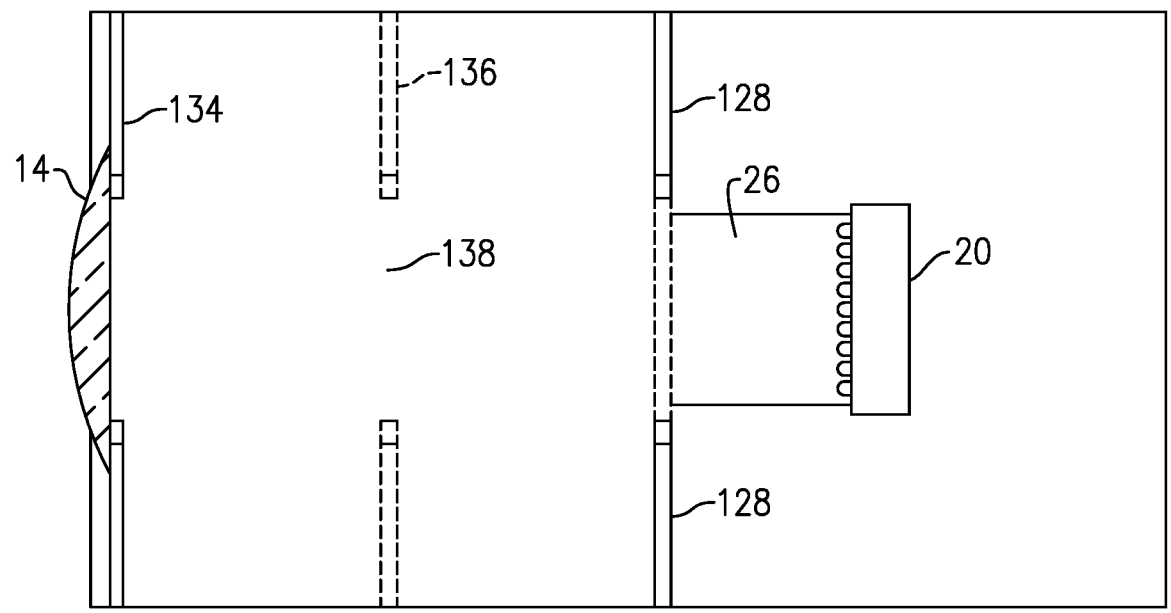
FIGS. 12 and 13 are sectional top plan and side elevation of an alternative embodiment employing an intermediate frame and aperture.
Figure 13:
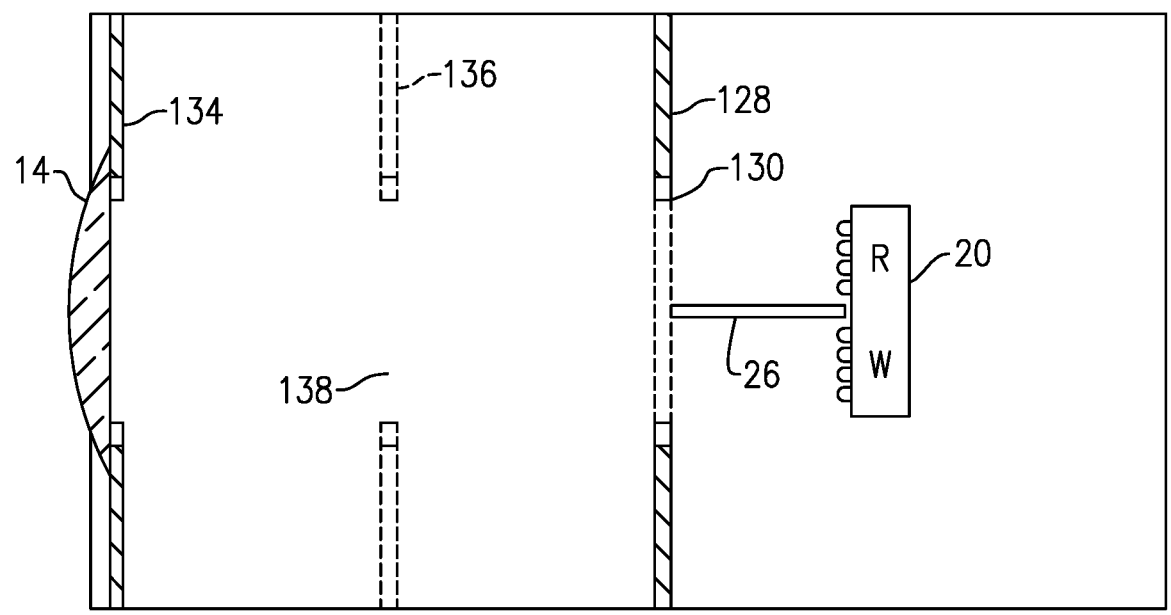

The PAPI light assembly of the type described just above may have one or more additional or intermediate frames or baffles positioned between the proximal or front frame 132 and the rear frame 128. In an embodiment, an intermediate frame 136 may be in the form of an oblong plate, as shown in FIG. 11, with a elongated aperture 138 that has a height and width which may be between those of the apertures 130 and 132 (FIGS. 9 and 10). Here the aperture 138 has chamfered corners giving it a shape that is an elongated octagon. In a practical embodiment as illustrated in the top plan sectional view of FIG. 12 and the sectional elevation of FIG. 13, the intermediate frame 136 is positioned midway front-to-back between the frames 128 and 134. The exact position can be calibrated and adjusted for optimal separation of the red and white portions of the projected beam.

Figure 14:
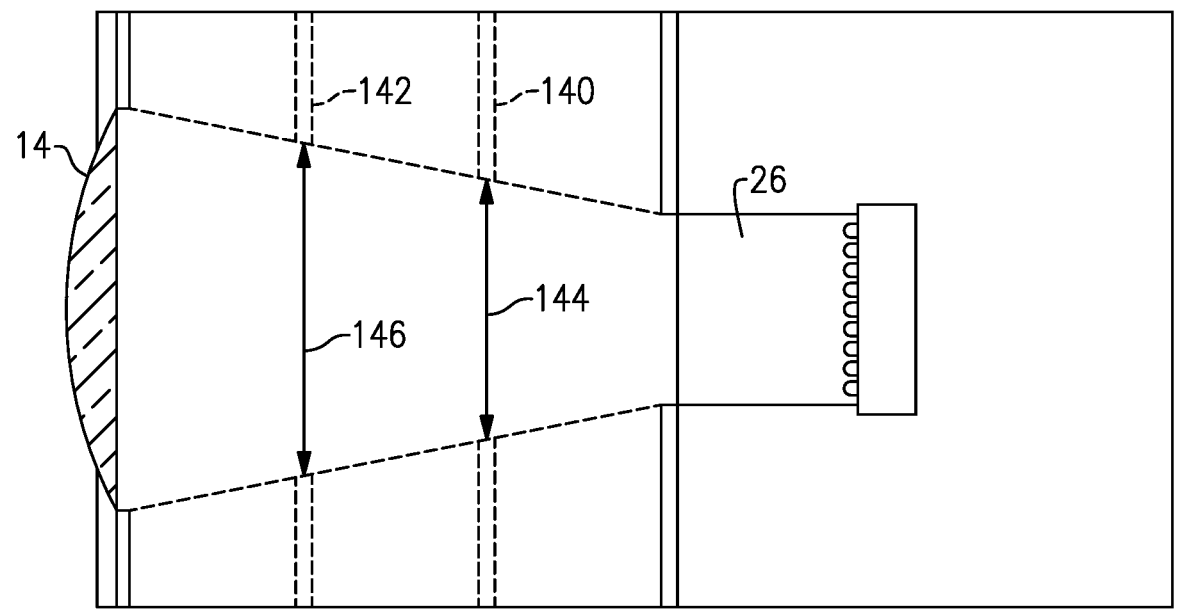
FIGS. 14 and 15 are sectional top plan and side elevation of another alternative embodiment employing plural intermediate apertured frames.
Figure 15:
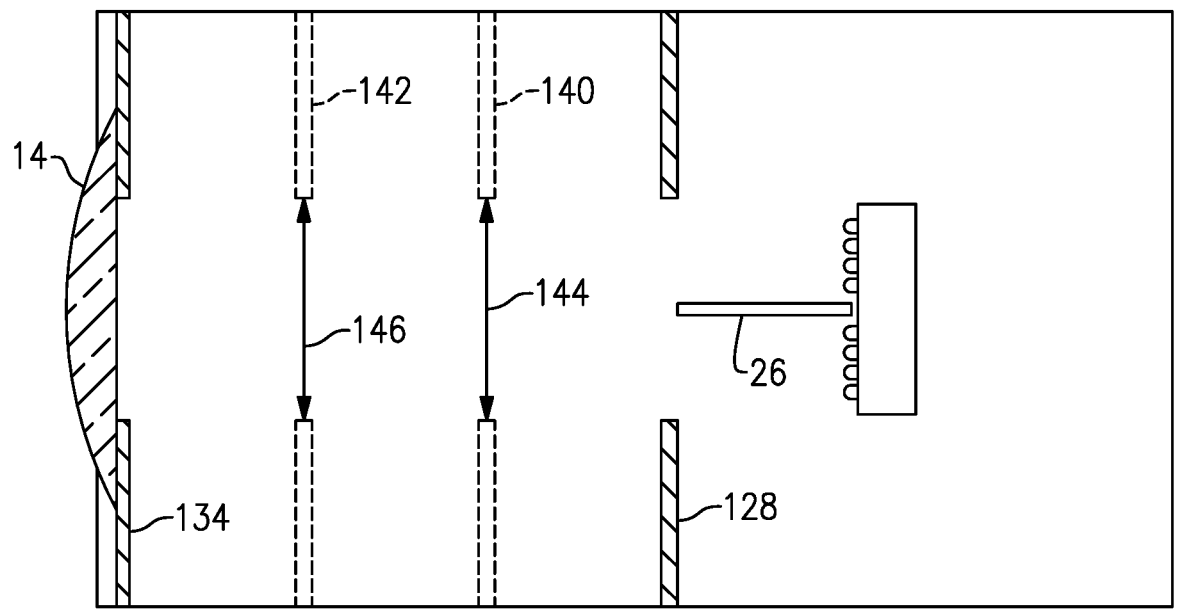

An embodiment of the PAPI light assembly having two intermediate frames 140, 142 with respective apertures 144 and 146 is shown in the sectional plan and elevation of FIGS. 14 and 15. The apertures 144 and 146 can have heights and widths about the same as the apertures 130 and 132, or substantially that of aperture 132. These are positioned at about one-third and two-thirds respectively front to back between the two frames 128 and 134. The exact position is calibrated for optimal performance. There can be yet additional baffles or aperture plates as needed.

In the illustrated embodiments, the upper and lower LED arrays 22 and 24 are each formed of two horizontal rows of individual LEDs. These arrays 22 may be made of more or fewer rows, or the LEDs of each array may be placed in a random or pseudo-random arrangement, as need be to optimize performance. In a proper embodiment, the arrays may consist of single LEDs configured as line sources of light rather than point sources.

Figure 16:
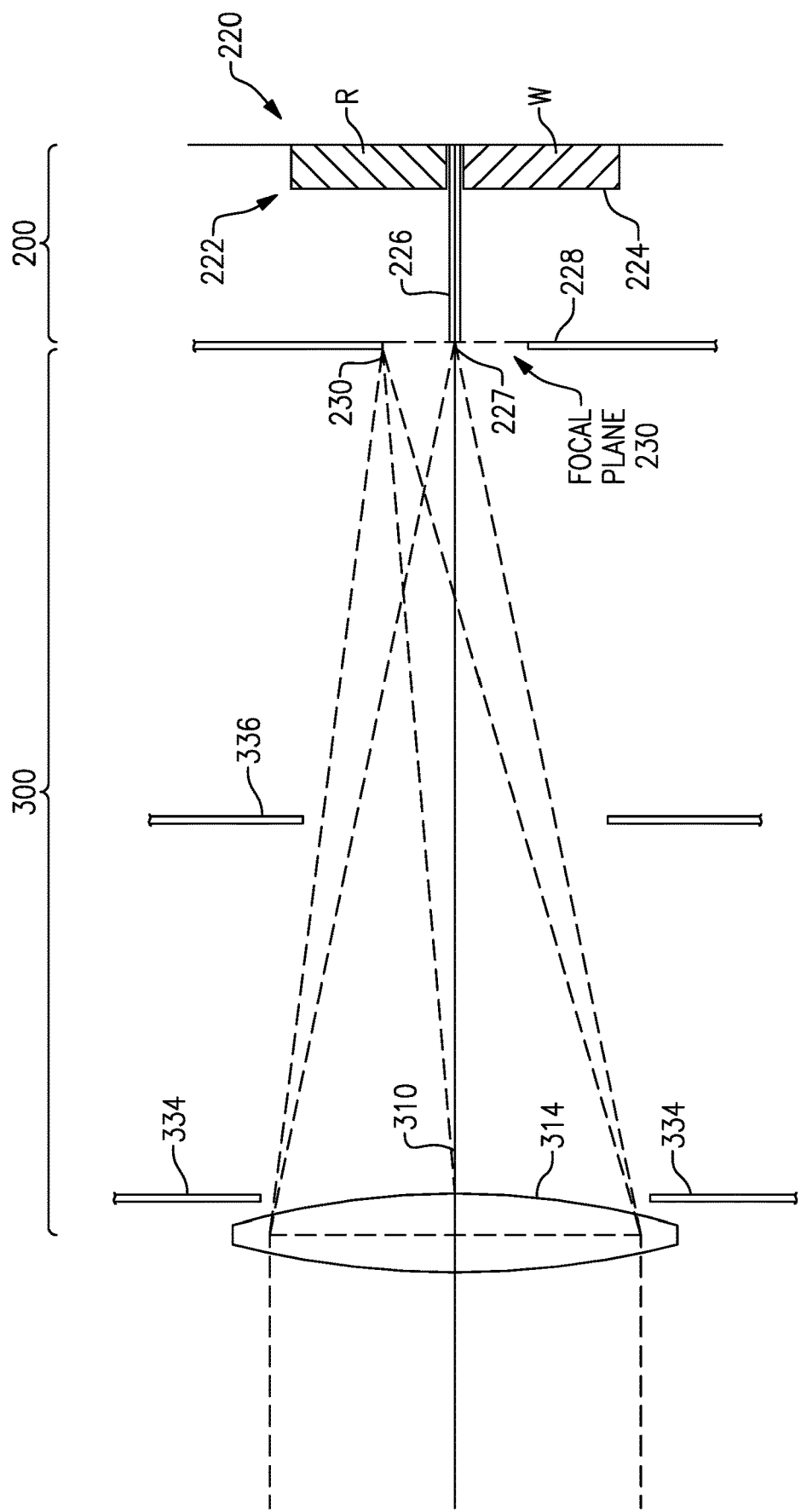
FIG. 16 is a schematic view of illumination and imaging systems employed in a PAPI device of a further embodiment.

FIG. 16 is a schematic sketch that defines the system of this invention as several various components, of which two major components are an illumination system 200 and an imaging system 300.

The purpose of the illumination system 200 is a) to provide sharp separation of the white and red illumination at the aperture plane and b) to provide the required illumination levels and distribution at the aperture plane.

The purpose of the imaging system 300 is to image the aperture plane into infinity and hence provide the intensity distribution across the red and white beams as specified by FAA, ICAO and other agencies.

Accordingly, the system requires:
A light source 224 meeting the white chromaticity requirements;
A light source 222 meeting the "red" chromaticity requirement (the red and white sources together comprising an emitting light source 220);
A horizontal blade 226 to separate white and red emissions sharply;
An aperture assembly 225 is formed in or mounted onto a plate or baffle 228 disposed at a plane normal to the optic axis at the distal end of the blade, with the front edge 227 of the blade extending across the aperture 230 of the baffle 228; and
The imaging system 300 at a minimum comprises a collimating or projection lens 314 that images such aperture 229 and front edge 227 of the blade 226 substantially into infinity.
Within the imaging system 300, a second aperture or distal aperture 334 is located at the collimating lens 314. Note that the distal aperture 334 is preferably elongated horizontally, and blocks off edges of the lens 314. The current preferred system uses a single biconvex spherical lens.
One or more in-between aperture plates 336 can be present to serve for stray light management. These can be configured to have aperture edges at the beam edges (shown in dash line here) and thus block stray light from beyond the edges of the light beams.

Figure 17:
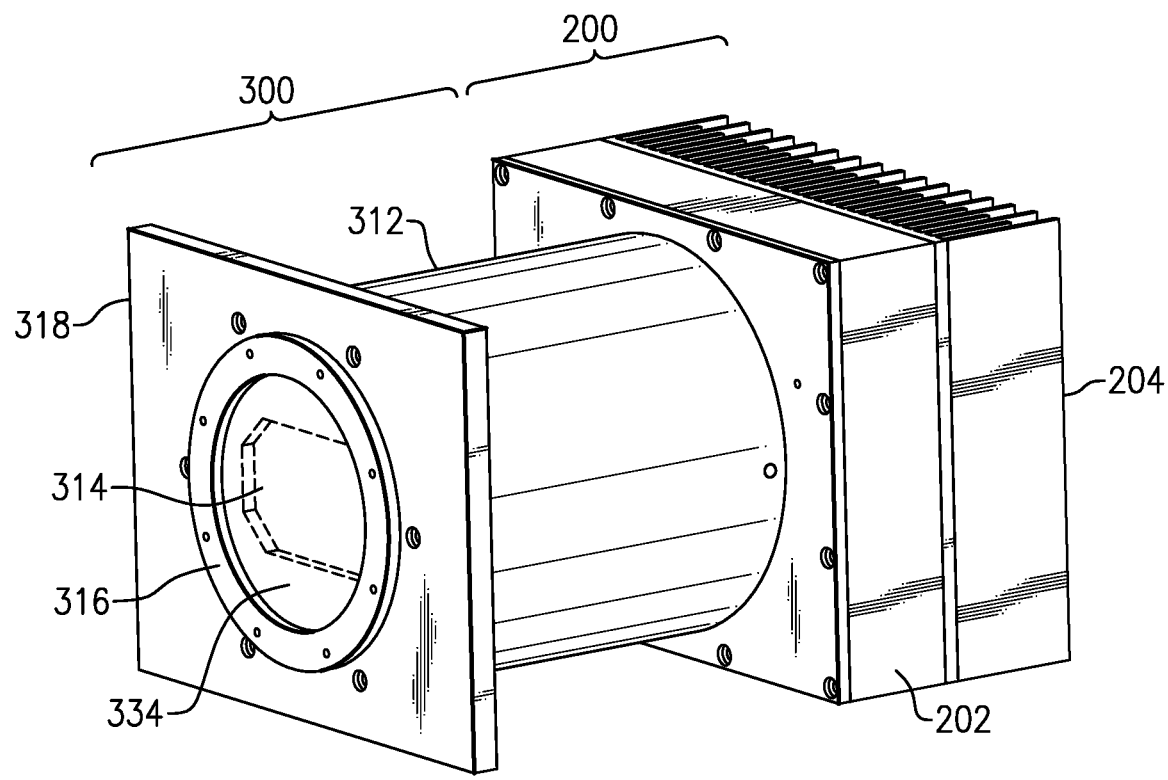
FIG. 17 is a front-left perspective view of the PAPI device of this embodiment.
Figure 18:
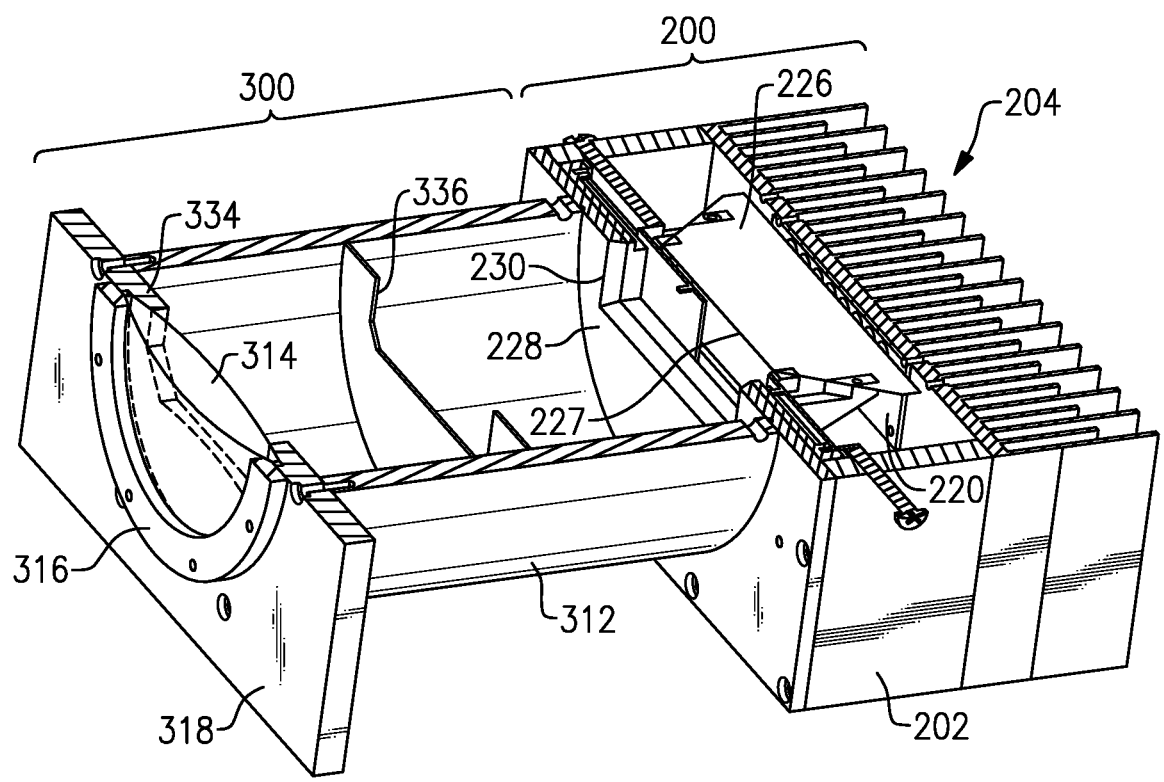
FIG. 18 is a cut-away front perspective cut away view, cut at a horizontal plane through the optic axis of the PAPI device.
Figure 19:
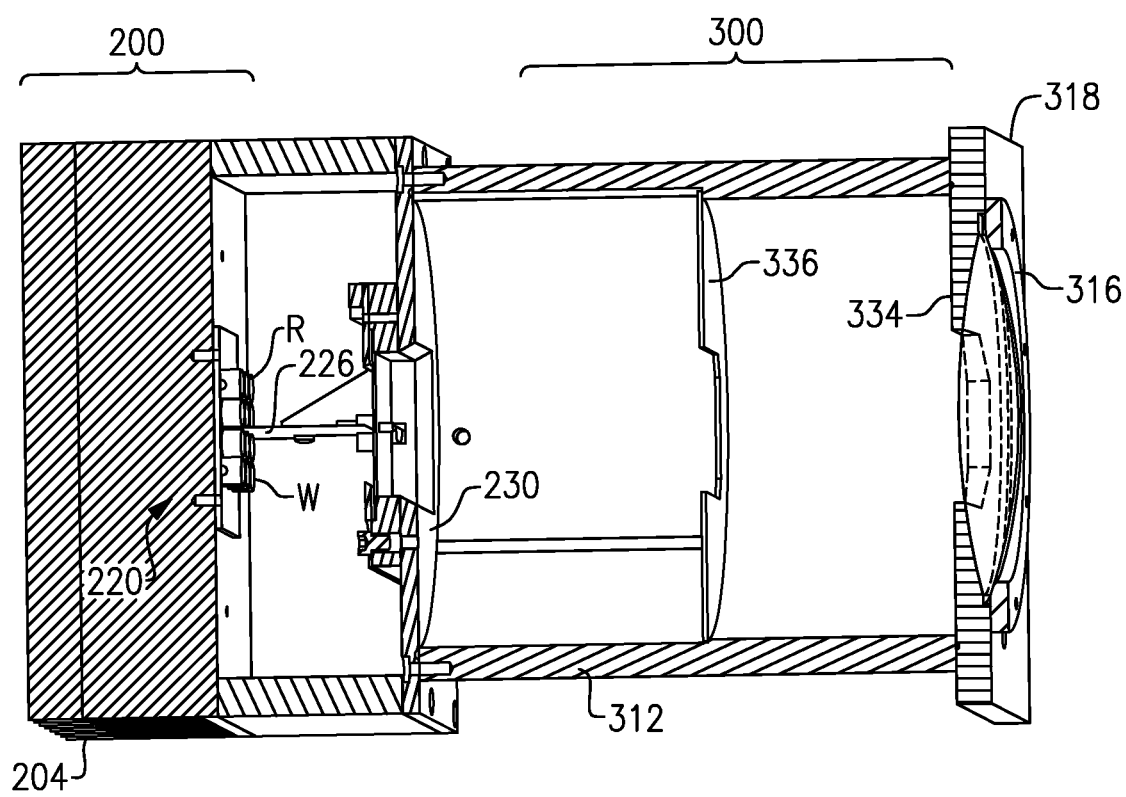
FIG. 19 is a cut-away side view cut at a vertical plane through the optic axis
Figure 20:
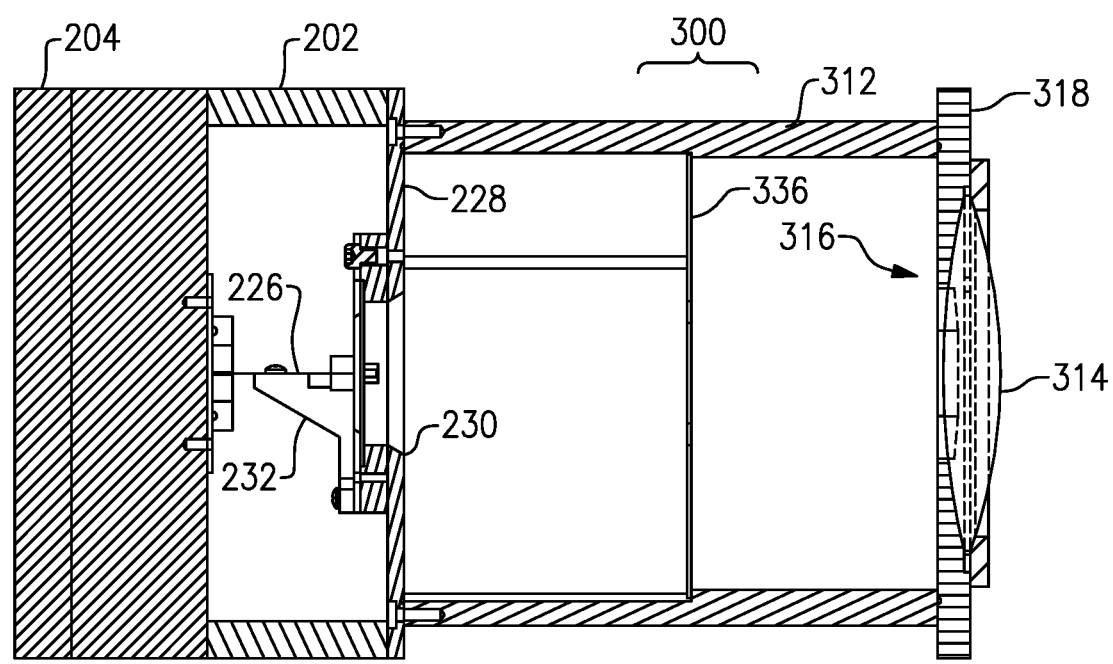
FIG. 20 is a side cut-away elevation thereof.
Figure 21:
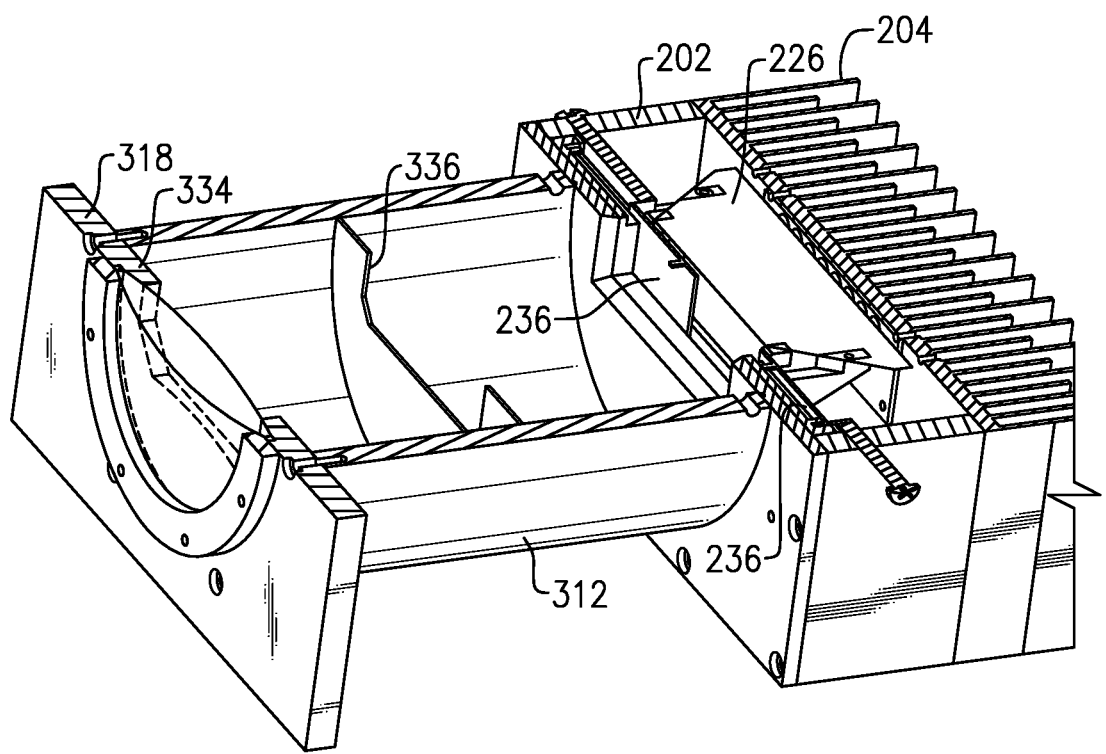
FIG. 21 is a front left cutaway perspective thereof.

In a preferred embodiment, as illustrated in the front perspective view of FIG. 17, the PAPI is formed with a box-shaped illumination section 200 and a generally cylindrical tubular barrel 312 forming the imaging section 300. A front frame 318 of square shape provides a mount for the projection lens 314 in a recess in the front plate 318, with a mounting ring 316 holding the lens in place, and with the aperture 334 formed into the front plate 318. Note that here the aperture 334 is elongated laterally, i.e., as a rectangle with chamfered corners or a laterally elongated octagon. The illumination section is shown to have a box-like illumination chassis 202 which holds the illumination arrangement (banks of red and white LEDs or red and white light pipes). While the barrel 312 of this embodiment is shown as cylindrical, the same could be of another profile or cross section, and could have a conic rather than cylindrical shape.

As shown in the cut-away views of FIGS. 18, 19, 20 and 21, an intermediate aperture plate 336 is situated in the barrel 312 about midway between the distal aperture 230 and the front or lens aperture 334. The aperture of the intermediate aperture plate 336 can have a similar shape to the front aperture 334, an oblong shape with chamfered corners (although that shape is not a requirement). This intermediate aperture plate serves to block stray light from passing to the lens 314.

At the proximal end of the barrel or shell is an aperture assembly 225 that comprises the aperture 230, front frame and other supporting structural members. The planar blade 226 is situated between the upper and lower light sources 222, 224, and is supported to lie in a horizontal plane that lies along the system optic axis. The front edge 227 of the blade 226 is in the form of a thin straight line that lies substantially at the focus of the lens 314. The blade 226 is supported on a holder 232 that is affixed to the aperture assembly 225. The aperture assembly 225 is affixed onto the first frame, with the first frame 228 being formed in a flat plate that closes off the front of the box 202. The opening of the frame 228 is oversized so as not to obstruct the beam. The aperture 230 is located at the front edge 227 of the blade 226. A pair of sliding gates or side baffles 236 can be incorporated into the aperture assembly 225 to mask off the edges of the aperture 230, as may be necessary if there are lateral obstructions forward of the PAPI system.

As already mentioned above, the imaging system can have a single lens, a lens group or a lens system where lenses are substantially spaced apart. The term "lens" in the above disclosure and claims is intended to a lens group, single lens, or multiple lens element focusing or projection lens.

Most preferably, due to concerns about heat management, power conservation, and lamp life, among other factors, the light source would be LED-based, or else employ solid-state laser or other source emitting radiation of specified wavelength(s).

In the described embodiments white light and red light are employed as the two colors on the upper and lower portions of the PAPI beams, but other colors may be employed, depending on the environment and purpose. Also, the term "LED" is used for purposes of convenience, but the term should be interpreted broadly here and in the claims below to include other solid-state devices, e.g., solid state lasers, surface emitters, and other devices that can emit monocolor (e.g., red) light or a broad band of light wavelengths, e.g., white light.

While this invention has been described in relation to one or more embodiments, the invention is not be limited only to such embodiments, but rather. Rather many variations are possible without departure from the scope and spirit of the invention, as defined in the Claims.

We claim:

1. Precision approach path indicator (PAPI) device which projects a beam of light along an airport runway glide path and is configured so that the beam transitions from a first color to a second color when an airplane moves above or below said runway glide path, the device comprising: a housing; a light source within said housing having first and second arrays of LEDs, the arrays emitting light of said first color and of said second color, respectively, the arrays being disposed generally in a plane defining an axis normal thereto such that the arrays emit light along said axis; a collimating lens of a predetermined width and height and having a predetermined focal length f, and having an optic axis aligned with the axis of said light source, and spaced distally from said light source; a first aperture plate formed of a first frame positioned between said light source and said collimating lens along said axis at a distance from said collimating lens substantially equal to said focal length f, and having a horizontally elongated aperture therein such that said elongated aperture lies on a focal plane of said collimating lens; and a planar blade extending from said light source to said first frame and having a proximal edge positioned between said first and second arrays of said LEDs and a distal edge extending transversely across the aperture of said first frame, such that the proximal edge of said planar blade is at a distance equal to said focal length f from said collimating lens and lies along the focal plane of said collimating lens.

2. Precision approach path indicator device according to claim 1 further comprising means positioned adjacent said collimating lens blocking light in said light from said light source from upper and lower sectors of said collimating lens at edges thereof and from left and right sectors at edges thereof and defining a laterally oblong open space to permit said light to reach said lens only at an elongated central portion defined between said sectors.

3. Precision approach path indicator device according to claim 1 further comprising a second aperture plate formed of a second frame positioned at said collimating lens and covering top and side edge portions of the lens and defining a horizontally elongated aperture therein.

4. Precision approach path indicator (PAPI) device which projects a beam of light along an airport runway glide path and is configured so that the beam transitions from a first color to a second color when an airplane moves above or below said runway glide path, the device comprising: a housing; a light source within said housing having first and second arrays of LEDs, the arrays emitting light of said first color and of said second color, respectively, the arrays being disposed generally in a plane defining an axis normal thereto such that the arrays emit light along said axis; a collimating lens of a predetermined width and height and having a predetermined focal length f, and having an optic axis aligned with the axis of said light source, and spaced distally from said light source; a first aperture plate formed of a first frame positioned between said light source and said collimating lens along said axis at a distance from said lens substantially equal to said focal length f, and having a horizontally elongated aperture therein; and a planar blade extending from said light source to said first frame and having a proximal edge positioned between said first and second arrays of said LEDs and a distal edge extending transversely across the aperture of said first frame such that the proximal edge of said planar blade is disposed at a focal plane of said collimating lens; and a second aperture plate in the form of a second frame defining a horizontally elongated aperture positioned at a proximal face of said collimating lens.

5. Precision approach path indicator device according to claim 4 comprising a shell enclosing said optic axis between said first and second aperture plates and having ends joined with said first and second frames.

6. Precision approach path indicator device according to claim 5 wherein said shell has a generally flat sides on top, bottom, left and right defining a generally rectangular section.

7. Precision approach path indicator device according to claim 5 wherein said shell is opaque and having generally non-reflective surfaces.

8. Precision approach path indicator device according to claim 4 wherein the aperture of said first frame has a width and a height, said width being between substantially one-and-a-half to three-times said height.

9. Precision approach path indicator device according to claim 4 wherein the aperture of said first frame is in the shape of a horizontally elongated octagon.

10. Precision approach path indicator device according to claim 4 wherein said planar blade has reflective upper and lower surfaces.

11. Precision approach path indicator device according to claim 4 wherein said arrays of LED of said light source emitting light of said first and second colors are each formed as a plurality of horizontal rows of LEDs that emit light of the respective color, with said planar blade being on a substantially horizontal plane situated between the lowest row of the first array and the uppermost row of the second array.

12. Precision approach path indicator device according to claim 4 wherein said first and second arrays of LEDs each include a plurality of LEDs and a plurality of individual collimating lenses each provided for a respective one of said LEDs.

13. Precision approach path indicator (PAPI) device which projects a beam of light along an airport runway glide path and configured so that the beam transitions from a first color to a second color when an airplane moves above or below said runway glide path, the device comprising: a housing; a light source within said housing having first and second arrays of LEDs, the arrays emitting light of said first color and of said second color, respectively, the arrays being disposed generally in a plane defining an axis normal thereto such that the arrays emit light along said axis; a collimating lens of a predetermined width and height and having a predetermined focal length f, and having an optic axis aligned with the axis of said light source, and spaced distally from said light source; a first aperture plate formed of a first frame positioned between said light source and said collimating lens along said axis at a distance from said lens substantially equal to said focal length f, and having a horizontally elongated aperture therein; a second aperture plate formed of a second frame positioned at said collimating lens and covering top and side edge portions of the lens and having a horizontally elongated aperture therein; a planar blade extending from said light source to said first frame and having a proximal edge positioned between said first and second arrays of said LEDs and a distal edge extending transversely at the aperture of said first aperture plate; and one or more intermediate aperture plates positioned along said optic axis between said first and second aperture plates.

14. Precision approach path indicator device according to claim 13 wherein the aperture of said first aperture plate has a width and a height, said width being between substantially one-and-one-half to three-times its height.

15. Precision approach path indicator device according to claim 13 comprising at least one additional aperture plate positioned between said first and said second aperture plates along an optic axis of said collimating lens; and wherein the apertures of said first and additional aperture plates are each in the shape of a horizontally elongated octagon.

16. Precision approach path indicator device according to claim 13 wherein said planar blade has reflective upper and lower surfaces.

17. Precision approach path indicator device according to claim 13 wherein said arrays of LEDs of said light source emitting light of said first and second colors are each formed as a plurality of horizontal row or rows of LEDs that emit light of the respective color, with said planar blade being on a substantially horizontal plane situated between the lowest row of the first array and the uppermost row of the second array.

18. Precision approach path indicator (PAPI) device which projects a beam of light along an airport runway glide path, the device comprising
an illumination portion that includes a housing, a light source within the housing producing two colors of light, one above and one below a predetermined optic axis; a front aperture plate secured to the housing and having a laterally elongated aperture formed therein and centered on said optic axis, and a planar blade disposed in a horizontal plane on said optic axis and between the two colors of light that emanate from said light source, and having a linear transverse edge positioned across said front aperture; and
an imaging portion including a shell portion with a proximal end secured to said illumination portion, said shell portion supporting at its distal end a front plate and a lens held in said front plate and centered on said optic axis and having a predetermined focal length, and said lens being supported in said front plate at a spacing from said aperture and from the linear transverse edge of said blade substantially equal to said focal length.

19. Precision approach path indicator according to claim 18 wherein said front plate has formed therein an aperture in which said lens is seated, and said aperture being of a laterally elongated shape optically blocking portions of top and bottom edges of said lens.

20. An approach path indicator according to claim 18, said imaging portion further including an intermediate baffle situated within said shell portion, and having an intermediate aperture formed therein and centered on said optic axis, and configured to permit light emanating directly from said illumination portion to pass through said intermediate aperture but to block stray light.

* * * * *